(12) United States Patent
Fujita et al.

(10) Patent No.: US 11,003,178 B2
(45) Date of Patent: May 11, 2021

(54) FACILITY DIAGNOSIS DEVICE, FACILITY DIAGNOSIS METHOD, AND FACILITY DIAGNOSIS PROGRAM

(71) Applicant: YOKOGAWA ELECTRIC CORPORATION, Tokyo (JP)

(72) Inventors: Sho Fujita, Tokyo (JP); Nobuhiro Tomosada, Tokyo (JP); Kazuma Takenaka, Tokyo (JP); Shinya Kato, Tokyo (JP); Taro Kemmotsu, Tokyo (JP)

(73) Assignee: YOKOGAWA ELECTRIC CORPORATION, Tokyo (JP)

( * ) Notice: Subject to any disclaimer, the term of this patent is extended or adjusted under 35 U.S.C. 154(b) by 264 days.

(21) Appl. No.: 16/074,942

(22) PCT Filed: Jan. 10, 2017

(86) PCT No.: PCT/JP2017/000427
§ 371 (c)(1),
(2) Date: Aug. 2, 2018

(87) PCT Pub. No.: WO2017/134983
PCT Pub. Date: Aug. 10, 2017

(65) Prior Publication Data
US 2019/0033840 A1    Jan. 31, 2019

(30) Foreign Application Priority Data

Feb. 3, 2016 (JP) .............................. JP2016-019066

(51) Int. Cl.
*G05B 13/02* (2006.01)
*G05B 23/02* (2006.01)
*G05B 17/02* (2006.01)

(52) U.S. Cl.
CPC ........... *G05B 23/024* (2013.01); *G05B 17/02* (2013.01); *G05B 23/0221* (2013.01);
(Continued)

(58) Field of Classification Search
CPC ................................................... G05B 23/024
(Continued)

(56) References Cited

U.S. PATENT DOCUMENTS 5,864,773 A    1/1999 Barna et al.
6,163,761 A *  12/2000 Kent ..................... G06Q 10/06
                                                    702/187

(Continued)

FOREIGN PATENT DOCUMENTS

JP   2009-270843 A   11/2009
JP   2010-049517 A    3/2010
WO   2013/132939 A1   9/2013

*Primary Examiner* — Ricky Ngon
*Assistant Examiner* — Ricky Go
(74) *Attorney, Agent, or Firm* — Osha Bergman Watanabe & Burton LLP

(57) ABSTRACT

A facility diagnosis device includes: a process data acquirer that acquires process data indicating a state of a process executed in a plant; a production data acquirer that acquires production data indicating a production state in the plant; a state information generator that generates state information for estimating an operation state of a facility operating in the process based on the acquired process data or the acquired production data, or the process data and the production data; and a determiner that determines the operation state of the facility based on the acquired process data or the generated state information and the acquired production data.

13 Claims, 4 Drawing Sheets

(52) U.S. Cl.
CPC ..... *G05B 23/0243* (2013.01); *G05B 23/0254* (2013.01); *G05B 2219/32201* (2013.01); *G05B 2219/37537* (2013.01)

(58) Field of Classification Search
USPC .......................................................... 702/183
See application file for complete search history.

(56) References Cited

U.S. PATENT DOCUMENTS

| | | | | |
|---|---|---|---|---|
| 6,738,682 | B1* | 5/2004 | Pasadyn | G05B 13/04 |
| | | | | 700/100 |
| 6,876,948 | B1* | 4/2005 | Smith | G05B 15/02 |
| | | | | 702/181 |
| 7,065,422 | B1 | 6/2006 | Green | |
| 8,381,117 | B2* | 2/2013 | Ueno | G05B 23/0272 |
| | | | | 715/771 |
| 8,830,052 | B2* | 9/2014 | Nakaya | G08B 5/22 |
| | | | | 340/506 |
| 9,110,452 | B2* | 8/2015 | Blevins | G06F 17/16 |
| 9,465,387 | B2* | 10/2016 | Noda | G05B 23/0232 |
| 2009/0204245 | A1* | 8/2009 | Sustaeta | H04L 67/125 |
| | | | | 700/99 |
| 2013/0191093 | A1* | 7/2013 | Leitch | G06F 30/20 |
| | | | | 703/6 |
| 2014/0324386 | A1 | 10/2014 | Spivey et al. | |
| 2015/0051871 | A1 | 2/2015 | Mimura | |
| 2015/0105887 | A1* | 4/2015 | Troy | G05B 19/41885 |
| | | | | 700/97 |

* cited by examiner

FACILITY DIAGNOSIS DEVICE, FACILITY DIAGNOSIS METHOD, AND FACILITY DIAGNOSIS PROGRAM

TECHNICAL FIELD

The present invention relates to a facility diagnosis device, a facility diagnosis method, and a facility diagnosis program.

Priority is claimed on Japanese Patent Application No. 2016-019066, filed on Feb. 3, 2016, the contents of which are incorporated herein by reference.

BACKGROUND ART

Conventionally, in a plant, a factory, and so on, process control is performed using various kinds of process data in industrial process. For example, process data measured from industrial process such as pressure, temperature, flow rate, and so on are used for the process control. The industrial process includes various types of facilities such as pumps, motors, compressors, and so on, and the industrial process is operated by controlling various process values by opening and closing valves, operating control of facilities, and so on. Failure of various types of facilities included in the industrial process is diagnosed by a diagnosis device. The diagnosis device measures vibrations, temperature, noise, or the like of the facility using various types of sensors, and the diagnosis device analyzes the operation state of the facility on the basis of the measurement result to diagnose the facility.

The diagnosis devices are roughly classified into an online diagnosis system that constantly monitors sensors installed in a facility online and a handy diagnosis device used for patrol inspection by a worker. In the online diagnosis system, a dedicated sensor is attached to a facility, data measured by the sensor is collected by a dedicated device, the data is analyzed with dedicated software, and failure of the facility is displayed on a display on the basis of the diagnosis result to notify the worker. In the online diagnosis system, for example, a vibration diagnosis system, a rod drop diagnosis system, a P-V (Pressure-Volume) analysis system and so on are available. In the facility diagnosis using the handy diagnosis device, a worker patrols devices of diagnosis target, measures data such as vibration using the handy terminal, and diagnoses the facility on the basis of the measured data.

The following patent literature 1 describes a finding method of abnormality data of automatically measuring operation information such as temperature, pressure, output, vibration, pH, electric conductivity, and flow rate relating to devices and facilities, comparing the measured operation information with past operation information, and displaying attention data on a monitor.

Further, the following patent literature 2 describes a monitoring system in which a sensor is attached to a monitoring target facility, and event data is extracted on the basis of the measured time series data to monitor and diagnose the monitoring target facility.

CITATION LIST

Patent Literature

[Patent Literature 1]
Japanese Unexamined Patent Application Publication No. 2010-049517

[Patent Literature 2]
Japanese Unexamined Patent Application Publication No. 2009-270843

However, in the conventional diagnosis device, if load condition of the facility, operation environment such as temperature and humidity, or the like fluctuate, the measurement result measured by the sensor also fluctuates. For this reason, there are cases where the state of the facility cannot be accurately diagnosed on the basis of the measurement result.

SUMMARY OF INVENTION

One or more embodiments of the present invention provide a facility diagnosis device, a facility diagnosis method, and a facility diagnosis program for accurately diagnosing a state of a facility.

A facility diagnosis device according to one or more embodiments includes a process data acquirer configured to acquire process data indicating a state of a process executed in a plant, a production data acquirer configured to acquire production data indicating a production state in the plant, a state information generator configured to generate state information for estimating an operation state of a facility operating in the process on the basis of the acquired process data or the acquired production data, or the process data and the production data, and a determiner configured to determine the operation state of the facility on the basis of the acquired process data or the generated state information and the acquired production data.

The facility diagnosis device according to one or more embodiments may further include a determination model creator configured to create a determination model on the basis of the acquired process data and the acquired production data, and a determination model selector configured to select the created determination model on the basis of the generated state information, and the determiner may determine the operation state of the facility using the selected determination model.

The facility diagnosis device according to one or more embodiments may further include a facility data collector configured to collect facility data measured by a sensor attached to the facility.

In the facility diagnosis device according to one or more embodiments, the determination model creator may create a determination model further on the basis of the collected facility data.

In the facility diagnosis device according to one or more embodiments, the determination model selector may select the determination model on the basis of the generated state information or the collected facility data.

The facility diagnosis device according to one or more embodiments may further include a maintenance data storer configured to collect and store maintenance data of the facility corresponding to the determined operation state, and the determination model creator may create a determination model further on the basis of the stored maintenance data.

In the facility diagnosis device according to one or more embodiments, the maintenance data storer may collect and store the maintenance data comprising at least one of the maintenance data of the facility and failure data of the facility.

A facility diagnosis method according to one or more embodiments includes a process data acquiring step of acquiring process data indicating a state of a process executed in a plant, a production data acquiring step of acquiring production data indicating a production state in the plant, a state information generating step of generating state information for estimating an operation state of a facility operating in the process on the basis of the acquired process data or the acquired production data, or the process data and the production data, and a determining step of determining the operation state of the facility on the basis of the acquired process data or the generated state information and the acquired production data.

The facility diagnosis method according to one or more embodiments may further include a determination model creating step of creating a determination model on the basis of the acquired process data and the acquired production data, and a determination model selecting step of selecting the created determination model on the basis of the generated state information, and the determining step may further include a step of determining the operation state of the facility using the selected determination model.

The facility diagnosis method according to one or more embodiments may further include a facility data collecting step of collecting facility data measured by a sensor attached to the facility.

In the facility diagnosis method according to one or more embodiments, the determination model creating step may further include a step of creating a determination model further on the basis of the collected facility data.

In the facility diagnosis method according to one or more embodiments, the determination model selecting step may further include a step of selecting the determination model on the basis of the generated state information or the collected facility data.

The facility diagnosis method according to one or more embodiments may further include a maintenance data storing step of collecting and storing maintenance data of the facility corresponding to the determined operation state, and the determination model creating step may further include a step of creating a determination model further on the basis of the stored maintenance data.

In the facility diagnosis method according to one or more embodiments, the maintenance data storing step may further include a step of collecting and storing the maintenance data comprising at least one of the maintenance data of the facility and failure data of the facility.

A non-transitory computer readable storage medium storing a facility diagnosis program according to one or more embodiments for making a computer may execute a process data acquiring process of acquiring process data indicating a state of a process executed in a plant, a production data acquiring process of acquiring production data indicating a production state in the plant, a state information generating process of generating state information for estimating an operation state of a facility operating in the process on the basis of the acquired process data or the acquired production data, or the process data and the production data, and a determining process of determining the operation state of the facility on the basis of the acquired process data or the generated state information and the acquired production data.

According to one or more embodiments of the present invention, it is possible to provide a facility diagnosis device, a facility diagnosis method, and a facility diagnosis program for accurately diagnosing a state of a facility.

DETAILED DESCRIPTION OF EMBODIMENTS

Hereinafter, a facility diagnosis device, a facility diagnosis method, and a facility diagnosis program according to one or more embodiments of the present invention will be described with reference to drawings.

Figure 1:
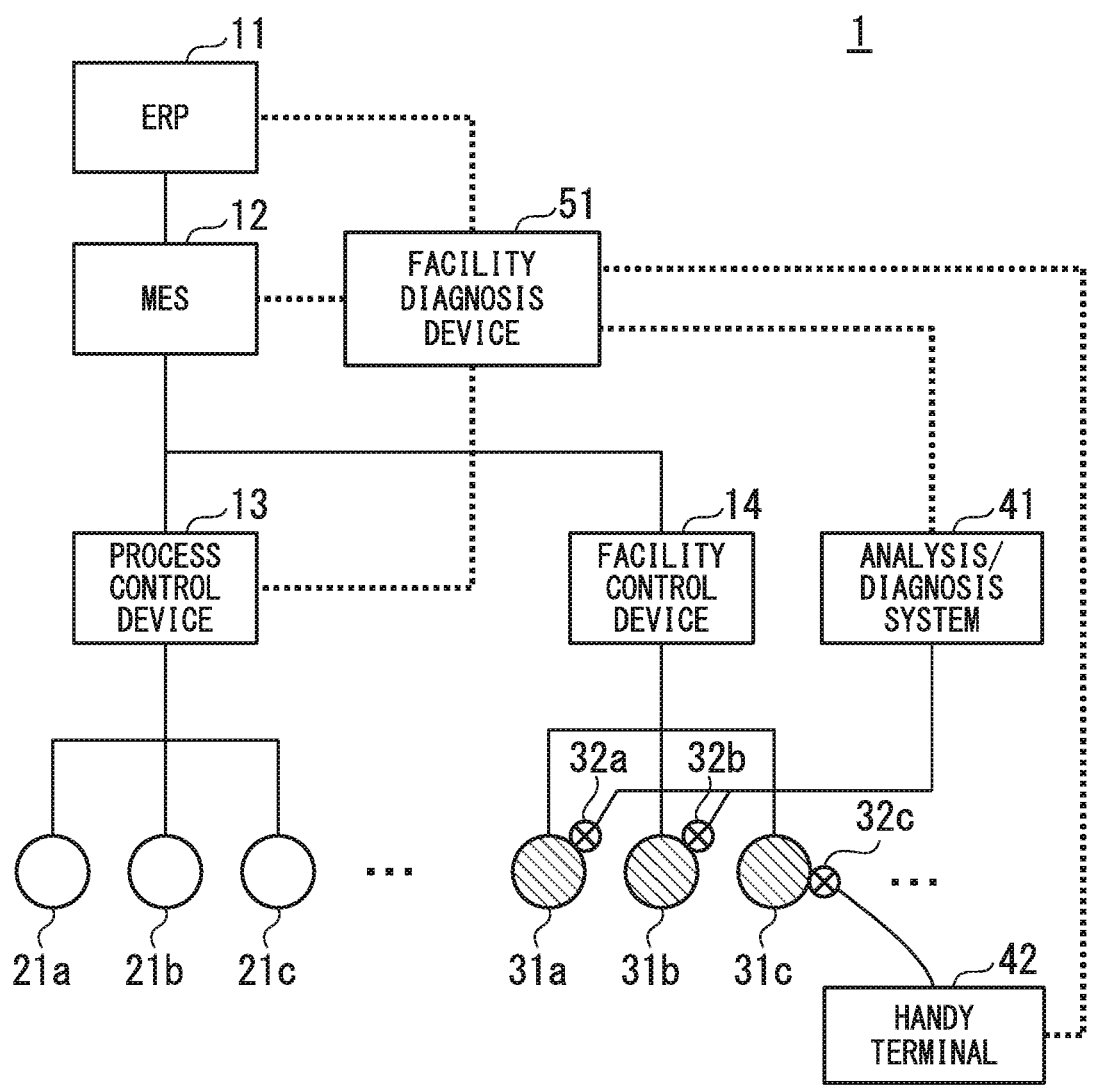
FIG. 1 is a block diagram showing an example of configuration of the facility diagnosis system according to one or more embodiments.

First, configuration of the facility diagnosis system will be described with reference to FIG. 1. FIG. 1 is a block diagram showing an example of configuration of the facility diagnosis system according to one or more embodiments.

In FIG. 1, the facility diagnosis system 1 includes a facility diagnosis device 51. In one or more embodiments, the facility diagnosis system 1 is a system including the facility diagnosis device 51, and further includes an ERP (Enterprise Resource Planning) 11, MES (Manufacturing Execution System) 12, a process control device 13, a facility control device 14, process devices 21, facilities 31, facility sensors 32, an analysis/diagnosis system 41, and a handy terminal 42, as an example.

The ERP 11 integrally manages resources such as human resources, funds, facilities, materials, information, and so on possessed by a company operating a plant. The ERP 11 has information such as a production plan for each product item in the industrial process, a procurement status of raw materials, and so on. In one or more embodiments, the information such as the production plan or the like possessed by the ERP 11 is referred to as "ERP information". The ERP information is used by each department of the company, such as a management department, a business department, and so on of the company. The ERP 11 outputs information used for plant operation to the MES 12 on the basis of the ERP information. On the other hand, the ERP 11 acquires information such as operation results of the plant from the MES 12.

Moreover, the ERP 11 acquires weather data indicating weather conditions at a production date and time on the basis of the production plan. The acquired weather data is included in the ERP information. The ERP 11 acquires the weather data from a weather data providing device (not shown). For example, the weather data providing device is a device that records weather conditions such as temperature, humidity, atmospheric pressure, presence or absence of lightning, presence or absence of earthquake, and so on in an area or place where the plant is installed. There are cases where volume, temperature, viscosity, hardness, level, and chemical reaction amount of raw materials, intermediate products, and products processed by the process device 21 vary due to weather conditions. If the raw materials varies due to the weather conditions, throughput in the process device 21 and load of the facility 31 may be affected. The ERP 11 acquires the weather data at a predetermined timing on the basis of the production plan. In one or more embodiments, the weather data has been described as being acquired from the weather data providing device by the ERP 11, but the method of collecting the weather data is not limited thereto. For example, the weather data may be acquired by the MES 12, the process control device 13, or the facility diagnosis device 51. The ERP 11 provides the ERP information to the facility diagnosis device 51. The dotted line shown in FIG. 1 represents that the facility diagnosis device 51 acquires information provided from each device.

The MES 12 manages the plant on the basis of information used for management of the plant acquired from the ERP 11. The MES 12 generates information (production information) for operating the plant and producing products on the basis of the information acquired from the ERP. The production information includes production management information such as a schedule for producing products. The MES 12 outputs the generated production information to the process control device 13 and the facility control device 14. On the other hand, the MES 12 acquires operation information indicating an operation state of the plant from the process control device 13 and the facility control device 14. The MES 12 can manage production results of products on the basis of the operation information acquired from the process control device 13 and the facility control device 14. The MES 12 can provide the ERP 11 with information such as the production results managed by the MES 12. The MES 12 also grasps operation states of the process device 21 controlled by the process control device 13 and operation conditions of the facility 31 controlled by the facility control device 14 on the basis of the acquired operation information. Thereby, the MES 12 can manage the quality of the products to be produced. The information possessed by the MES 12, such as production information generated by the MES 12, operation information acquired from the process control device 13 and the facility control device 14, and so on is referred to as "MES information". The MES 12 provides the MES information to the facility diagnosis device 51. The MES information includes operation schedule of the plant for producing products or operation results. The operation results of the plant includes information indicating operation states of each process device 21 and each facility 31. For example, the operation states of each process device 21 and each facility 31 provided by the MES 12 may include information such as a load state (for example, information on a high load state or a low load state) of each process device 21 and each facility 31 at each time, production quantity, elapsed date and time after maintenance, and operation time of the plant, and so on.

The process control device 13 controls the process device 21 on the basis of the production information acquired from the MES 12. For example, the process control device 13 is a DCS (Distributed Control System), an FA (Factory Automation) computer, a PLC (Programmable Logic Controller), or the like. The process control device 13 outputs an operation instruction to the process device 21. The operation instruction output to the process device 21 by the process control device 13 is based on specifications of the process device 21. The operation instruction may be, for example, an instruction value of a current value from 4 to 20 mA, an ON/OFF instruction, or the like. The process control device 13 acquires process data from the process device 21. The process data acquired from the process device 21 by the process control device 13 includes, for example, temperature, pressure, displacement amount, flow rate, level, current, voltage, liquid analysis data, gas analysis data, pH, conductivity, concentration, or the like. For example, the process control device 13 can acquire the process data from the process device 21 by a current value from 4 to 20 mA, a contact output by ON/OFF of a relay, or the like. The process control device 13 provides the process data acquired from the process device 21 to the facility diagnosis device 51.

The process device 21 is a device controlled by the process control device 13. In FIG. 1, reference numerals such as 21a, 21b, or 21c are attached to the process devices 21 in order to represent that a plurality of process devices 21 is included in the plant. For example, the process device 21 is an actuator that operates on the basis of an output from the process control device 13. For example, the actuator is a pump, a valve, a motor, or the like, and may include a motor driving device or the like. The process device 21 is a measuring instrument that outputs process values to the process control device 13. For example, the measuring instrument is a thermometer, a pressure gauge, a displacement meter, a flow meter, a level meter, an ammeter, a voltmeter, or the like. The measuring instrument may be a liquid analyzer such as a pH meter, a conductivity meter, a near infrared spectroscopic analyzer, a liquid density meter, a turbidimeter, a residual chlorine analyzer, or the like. Further, the measuring instrument may be a gas analyzer such as a laser gas analyzer, an oxygen concentration meter, a gas chromatograph, a gas calorimeter, or the like.

The facility control apparatus 14 controls the facility 31 on the basis of production information acquired from the MES 12. For example, the facility control device 14 is an FA computer, a PLC or the like. The facility control device 14 outputs an operation instruction to the facility 31 in the same manner as the process control device 13.

The facility 31 is a device controlled by the facility control device 14. In FIG. 1, reference numerals such as 31a, 31b, or 31c are attached to the facilities 31 in order to represent that a plurality of facilities 31 is included in the plant. For example, the facility 31 is an air compressor, a pump, a robot, a conveyor, a fan, a turbine, a generator, a motor, a blower, or the like.

The facility sensor 32 is a sensor for diagnosing a facility. For example, the facility sensor 32 is a vibration sensor for detecting vibration of the facility, an acoustic sensor for detecting sound generated from the facility, a temperature sensor for detecting heat generation of the facility, an ultrasonic sensor for detecting ultrasonic waves of the facility, an AE (Acoustic Emission) sensor, or the like. The facility sensor 32 is attached to the facility 31. As shown in FIG. 1, the facility sensor 32a is attached to the facility 31a, the facility sensor 32b is attached to the facility 31b, and the facility sensor 32c is attached to the facility 31c.

The facility sensor 32a and the facility sensor 32b are dedicated sensors attached to the facility 31a and facility 31b to measure facility data for diagnosis. The facility data measured by the facility sensor 32a and the facility sensor 32b is acquired by the analysis/diagnosis system 41. The analysis/diagnosis system 41 is an online diagnosis device that constantly monitors the facility data measured by the facility sensor 32a and the facility sensor 32b and diagnoses the facility 31a and the facility 31b online. For example, the analysis/diagnosis system 41 acquires the facility data from the facility sensor 32a and the facility sensor 32b at predetermined time intervals. The analysis/diagnosis system 41 analyzes the acquired facility data using dedicated software to diagnose the facility 31a and the facility 31b. For example, the diagnosis is detection of deterioration of facility, failure of facility, or sign of failure of facility on the basis of the facility data. For example, the analysis/diagnosis system 41 is a system diagnosing vibration of the facility 31, a system diagnosing rod drop of a bearing of the facility 31, or a system analyzing operation state of an air compressor on the basis of a relationship between pressure and volume inside a cylinder of the air compressor. The analysis/diagnosis system 41 provides facility sensor data to the facility diagnosis device 51. The facility sensor data includes facility data acquired from the facility sensor 32a and the facility sensor 32b, diagnostic results diagnosed on the basis of the facility data, or the like. In the following description, the facility sensor data may be abbreviated as "facility data".

The facility sensor 32c is a sensor connected to the handy terminal 42. The handy terminal 42 is carried by a worker who diagnoses the facility 31c. The worker attaches the facility sensor 32c to the facility 31c and diagnoses the facility 31c using an analysis function of the handy terminal 42. The handy terminal 42 provides facility sensor data to the facility diagnosis device 51. The facility sensor data includes the facility data acquired from the facility sensor 32c, the diagnosis results diagnosed on the basis of the facility data, and so on. The facility sensor data can be provided from the handy terminal 42 to the facility diagnosis device 51, for example, via a recording medium, via wireless communication, or via a connection cable.

The facility diagnosis device 51 acquires the ERP information from the ERP 11. The facility diagnosis device 51 acquires the MES information from the MES 12. The facility diagnosis device 51 acquires the process data from the process control device 13. Further, the facility diagnosis device 51 acquires the facility sensor data from the facility control device 14 and the handy terminal 42. Here, the ERP information acquired from the ERP 11 and the MES information acquired from the MES 12 by the facility diagnosis device 51 are collectively referred to as "production data".

This concludes the description of the configuration of the facility diagnosis system with reference to FIG. 1.

Figure 2:
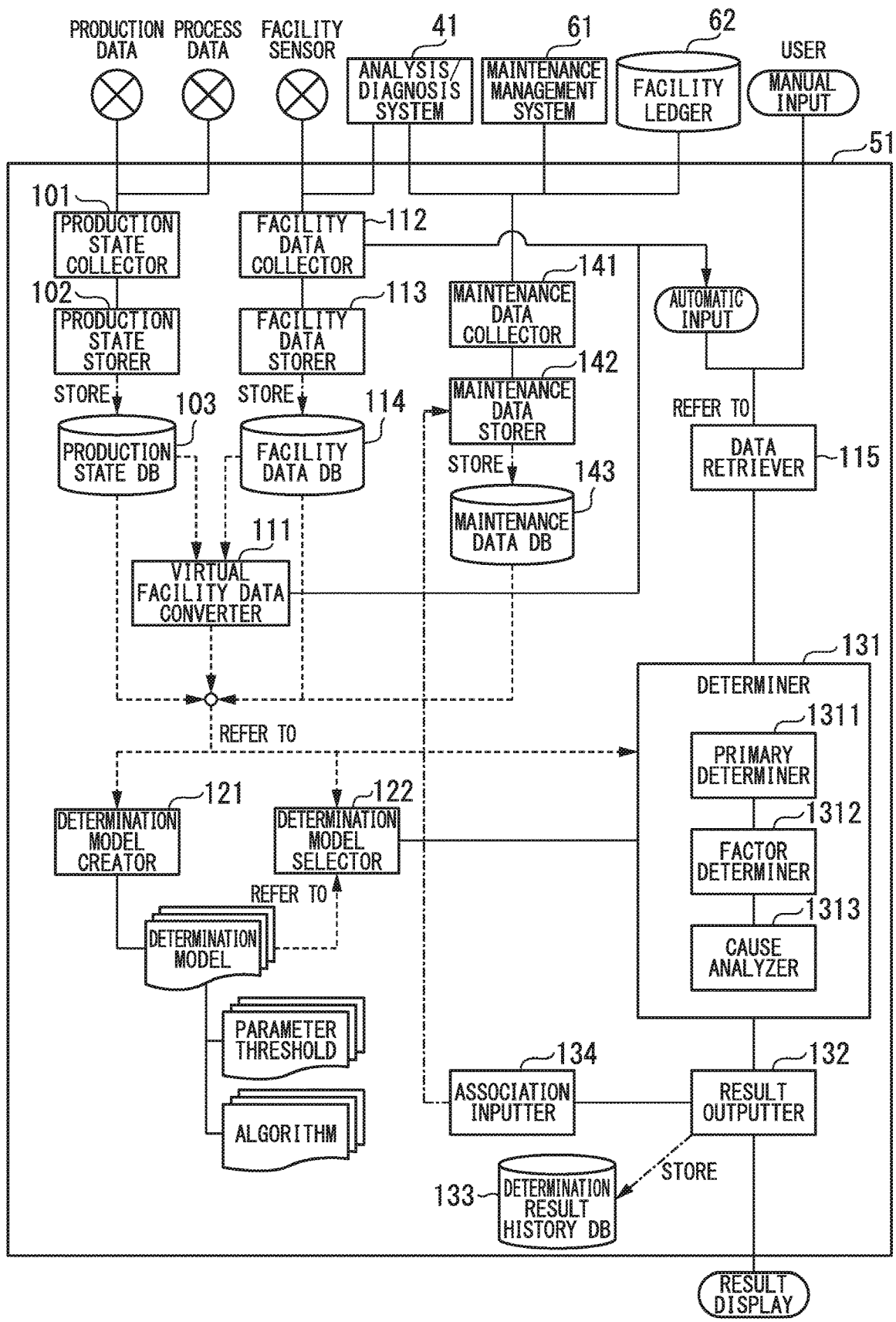
FIG. 2 is a block diagram showing an example of configuration of the facility diagnosis device according to one or more embodiments.

Next, configuration of the facility diagnosis device 51 described in FIG. 1 will be described with reference to FIG. 2. FIG. 2 is a block diagram showing an example of configuration of the facility diagnosis device 51 according to one or more embodiments.

In FIG. 2, the facility diagnosis device 51 includes each function of a production state collector 101, a production state storer 102, a production state DB (Database) 103, a virtual facility data converter 111, a facility data collector 112, a facility data storer 113, a facility data DB 114, a data retriever 115, a determination model creator 121, a determination model selector 122, a determiner 131, a result outputter 132, a determination result history DB 133, an association inputter 134, a maintenance data collector 141, a maintenance data storer 142 and a maintenance data DB 143. The determiner 131 has each function of a primary determiner 1311, a factor determiner 1312, and a cause analyzer 1313. The each function of the facility diagnosis device 51 can be implemented by software executed by a CPU (Central Processing Unit) (not shown) of the facility diagnosis device 51. That is, the each function of the facility diagnosis device 51 may be stored in a storage (not shown) as a program and executed by the CPU.

The production state collector 101 collects production data from the ERP 11 and the MES 12. The production state collector 101 also collects process data from the process control device 13. The production state collector 101 collects the production data and the process data under a predetermined collection condition. The predetermined collection condition is, for example, when a predetermined time has come, when the production data is changed, when an operation of collecting data is performed by a worker, or the like. The predetermined collection condition for collecting the production data and the predetermined collection condition for collecting the process data may be the same or different. For example, the predetermined collection condition for collecting the process data may be a condition such as when the process data is transmitted from the process control device 13, when batch of products produced in the plant is switched, when load of the process device 21 changes, or the like. The production state collector 101 outputs the collected production data and the collected process data to the production state storer 102.

The production state storer 102 stores the production data and the process data acquired from the production state collector 101 into the production state DB 103.

The production state DB 103 stores the production data and the process data. The production data and the process data are stored in association with each other in a predetermined recording method in the production state DB 103. The production data and the process data stored in the production state DB 103 can be referred to from the determination model creator 121.

The virtual facility data converter 111 acquires, from the production state DB 103, the production data acquired from the ERP 11 and the MES 12 and the process data acquired from the process control device 13. Further, the virtual facility data converter 111 acquires the facility sensor data from the facility data DB 114. The virtual facility data converter 111 generates virtual facility data on the basis of at least one of the production data and the process data which have been acquired. Therefore, the virtual facility data converter 111 may generate the virtual facility data on the basis of both the production data and the process data. The virtual facility data converter 111 converts the production data or the process data into the virtual facility data to generate the virtual facility data.

Moreover, in addition to at least one of the production data and the process data, the virtual facility data converter 111 can generate the virtual facility data further on the basis of the acquired facility sensor data. Since the virtual facility data is generated further on the basis of the facility sensor data, more detailed operation state of the facility can be estimated.

When diagnosing a facility as a larger concept, there are cases where a part may be facility sensor data, but another part may be virtual facility data. For example, it is conceivable that entire facility data is not acquired as a whole of a desulfurization device, but a vibration meter is attached to a motor that is a configuration element. In such a case, the facility data is utilized for the motor and the virtual facility data is generated for the other configuration elements to implement facility diagnosis for estimating operating state of the whole of the desulfurization device.

The virtual facility data is state information for estimating operation state of the facility from the production data and the process data, and is used for a simple diagnosis of the facility. Normally, in order to measure a state of the facility, for example, a facility sensor is attached inside the facility, and the facility is diagnosed on the basis of the facility data measured by the facility sensor. However, depending on the facility data to be measured, a trouble in which installation of the facility sensor is difficult, and an expensive facility sensor is necessary to be installed, may occur. For example, in order to measure P-V characteristics of an air compressor, it is necessary to attach a pressure sensor directly inside a high temperature and high pressure cylinder and to attach a displacement angle sensor that accurately measures the stroke of the cylinder. Therefore, installation costs of the facility sensor become high.

For example, the virtual facility data converter 111 acquires process data measured by a pressure gauge, a flow meter, a thermometer or the like attached to an inlet side and an outlet side of the air compressor. The virtual facility data converter 111 generates virtual facility data that substitutes the P-V characteristics of the air compressor on the basis of the acquired process data. The virtual facility data converter 111 provides the generated virtual facility data to the determiner 131. The determiner 131 estimates an internal state of the air compressor on the basis of the virtual facility data to execute a simple diagnosis.

The facility data collector 112 acquires facility sensor data from the analysis/diagnosis system 41 (or the handy terminal 42). The facility data collector 112 may directly acquire the facility sensor data from the facility sensor 32. The facility data collector 112 acquires the facility sensor data under a predetermined condition. The predetermined condition is, for example, when a predetermined time has come, when a predetermined change occurs in the facility sensor data, when an abnormality of the facility 31 is detected in the diagnosis results from the analysis/diagnosis system 41 or the handy terminal 42, when an operation of collecting data is performed by a worker, or the like. The facility data collector 112 outputs the acquired facility sensor data to the facility data storer 113. The facility sensor data acquired by the facility data collector 112 is automatically input into the determiner 131 via the data retriever 115.

The facility data storer 113 stores the facility sensor data acquired from the facility data collector 112 into the facility data DB 114 for each facility. For example, the facility data storer 113 stores the facility sensor data acquired from the facility 31*a* and the facility sensor 32*a* in association with each other.

The facility data DB 114 stores the facility sensor data for each facility. The stored facility sensor data can be referred to from the virtual facility data converter 111, the determination model creator 121, the determination model selector 122, and the determiner 131.

The data retriever 115 retrieves and refers to the production state DB 103, the facility data DB 114, and the maintenance data DB 143 on the basis of the facility sensor data or the virtual facility data which have been input automatically or information manually input by an operator (user), and the data retriever 115 outputs the retrieval result to the determiner 131. For example, if the operator selects a specific facility 31 to perform an operation input for executing a manual diagnosis, the data retriever 115 retrieves the production data, the process data, the facility sensor data, and the maintenance data of the specified facility 31, and outputs, to the determiner 131, the production data, the process data, the facility sensor data, and the maintenance data which have been retrieved.

The determination model creator 121 creates a determination model on the basis of the production data or the process data stored in the production state DB 103, the facility sensor data stored in the facility data DB 114, or the maintenance data stored in the maintenance data DB 143. The determination model is obtained by modeling a feature of combination of various parameters affecting the facility 31, such as a production state of the plant based on the production data, a process state based on the process data, a facility state based on the facility sensor data, and so on. Upon modeling, features are made conspicuous by separating and extracting populations with similar conditions from the entire data. Therefore, a plurality of determination models may exist in accordance with the conditions that characterize the data. The determination model may include parameters to be managed, their threshold values, arithmetic expressions and algorithms for analyzing using the parameters, and so on. For example, the determination model creator 121 classifies a production state on the basis of the production data, determines threshold values of the process data and the facility sensor data and an algorithm for diagnosis for each production state, and creates a determination model including the determined threshold values and the algorithm for each production state. The determination model creator 121 stores the created determination model so that the determination model selector 122 can refer to the determination model.

The determination model selector 122 selects one determination model from the determination models created by the determination model creator 121 on the basis of the production data or the process data stored in the production state DB 103, the facility sensor data stored in the facility data DB 114, or the maintenance data stored in the maintenance data DB 143. For example, on the basis of the production data input into the determiner 131, the determination model selector 122 selects a determination model having a production state similar to the production state related to the facility sensor data and the virtual facility data which have been input into the determiner 131. The determination model selector 122 selects a determination model having characteristics similar to those of population on the basis of a production state of the plant based on the production data, a process state based on the process data, a facility state based on the facility sensor data, and so on. The determination model selector 122 notifies the determiner 131 of the selected determination model.

Using the determination model selected by the determination model selector 122, the determiner 131 determines an operation state of the facility 31 on the basis of the production data, the process data, the facility sensor data, or the maintenance data retrieved by the data retriever 115. The determiner 131 determines whether the facility is normal or abnormal on the basis of the production data, the process data, the facility sensor data, or the maintenance data by using the threshold and the algorithm of the parameter of the selected determination model. If the determiner 131 determines that the facility is abnormal, the determiner 131 analyzes the cause of the abnormality. The determiner 131 can use one or more data of the production data, the process data, the facility sensor data, and the maintenance data. For example, the determiner 131 determine on the basis of the production data and the process data. The determiner 131 includes a primary determiner 1311, a factor determiner 1312, and a cause analyzer 1313.

Using the determined determination model, the primary determiner 1311 executes a primary determination of normality or abnormality on the basis of the production data, the process data, the facility sensor data, or the maintenance data which has been input. If the primary determiner 1311 determines that it is normal, the determiner 131 outputs the diagnosis result of the normality determination to the result outputter 132. On the other hand, if the primary determiner 1311 determines that it is abnormal, the determiner 131 executes a factor determination process by the factor determiner 1312.

In a case where the primary determiner 1311 determines that it is abnormal, the factor determiner 1312 executes a factor determination for determining whether the determined abnormality is caused by process fluctuation based on the production data (process factor), whether it is caused by an abnormality in the facility (facility factor). Using the determination model selected by the determination model selector 122, the factor determiner 1312 executes the factor determination on the basis of a production state in the process included in the production data, a process state based on the process data, an operation state of the facility that executes the process, a state of the facility sensor data, the maintenance data, or the like. Since the factor determiner 1312 executes the factor determination using the determination model selected by the determination model selector 122, the factor determiner 1312 can determine an abnormality caused by a process factor. Therefore, determination accuracy can be improved. For example, the process factor is an alarm generated due to exceeding the management threshold of the facility and occurrence of an unsteady state because an operation for rapid process fluctuation is performed on the driving side even if the facility is not abnormal. In the conventional method, since the operation instructions on the process side are not integrated, it is necessary for a person to check the history each time and to perform a determination work.

The cause analyzer 1313 analyzes the cause on the basis of the factor determined by the factor determiner 1312. For example, if the factor determiner 1312 determines that the abnormality is caused by the process factor, the cause analyzer 1313 analyzes the cause of the abnormality with respect to the process determined to be abnormal. If the factor determiner 1312 determines that the abnormality is caused by the facility factor, the cause analyzer 1313 analyzes the cause of the abnormality with respect to the facility 31 determined to be abnormal. The cause analyzer 1313 outputs the analysis result to the result outputter 132.

The result outputter 132 displays and outputs the determination result output from the determiner 131 on a display device (not shown). The result outputter 132 stores the determination result output from the determiner 131 into the determination result history DB 133. Further, the result outputter 132 outputs the determination result output from the determiner 131 to the association inputter 134.

The association inputter 134 enables to input maintenance data of the facility corresponding to the determination result acquired from the result outputter 132.

For example, as a method of inputting maintenance data, the association inputter 134 enables a worker, who has checked the displayed/output determination result, to input items relating to the determined facility. For example, if it is determined that the cause of the abnormality is the facility factor in the determination result, the association inputter 134 displays a manual input field for the facility determined to be abnormal on the display device. The manual input field may be selected by pull-down menu, radio button or check box, or free word text may be input to the manual input field. For example, maintenance records such as replacement history of consumable items, replacement history of components, lubrication history, failure history, and so on relating to the facility may be input into the manual input field.

Further, additional information by the worker, such as examination result by the worker's sense, such as visual sense, tactile sense, auditory sense, and so on can be input into the manual input field. Further, the association inputter 134 may enable to input photographs of the determined facility, various kinds of facility data, and so on. Since the association inputter 134 enables to input the maintenance data as described above, it is possible to collect information that is difficult for measuring instruments to collect, such as know-how of a worker. For example, even if the determiner 131 determines that an abnormality is caused by a facility factor, there are cases where a worker determines that the facility is not abnormal as a result of directly checking the operation state of the facility. Since the association inputter 134 enables to input the operation state of the facility directly checked by the worker and the determination result in association with each other, the determination result and the know-how of the worker can be accumulated in association with each other, and it can be fed back to the determination. The association inputter 134 outputs, to the maintenance data storer 142, the maintenance data which has been input.

The maintenance data collector 141 acquires maintenance management data from the maintenance management system 61. The maintenance data collector 141 may acquire the facility sensor data measured by the facility sensor from the analysis/diagnosis system 41 or the handy terminal 42.

Here, the maintenance management system 61 is a system for managing maintenance data, such as a maintenance plan of facility and maintenance results. For example, the maintenance management system 61 may be implemented as a function of the ERP 11 or the MES 12.

Further, the maintenance data collector 141 refers to the facility ledger 62 and acquires facility information. For example, the facility ledger 62 may be implemented as a function of the ERP 11 or the MES 12. For example, the facility information includes information, such as specifications of each facility (device) of the facility 31*a*, the facility 31*b*, and the facility 31*c* described in FIG. 1. The maintenance data collector 141 outputs, to the maintenance data storer 142, the facility sensor data, the maintenance data, and the facility information which have been collected.

The maintenance data storer 142 stores, into the maintenance data DB, the maintenance data acquired from the association inputter 134, the facility sensor data, the maintenance data, and the facility information collected from the maintenance data collector 141 (these pieces of information are referred to as "maintenance"). The maintenance data storer 142 stores the maintenance data, the facility sensor data, and the facility information in association with each other. That is, the maintenance data storer 142 stores the determination result of the operation state of the facility and the maintenance data in association with each other.

The maintenance data DB 143 stores the maintenance data and so on stored by the maintenance data storer 142. The maintenance data and so on stored in the maintenance data DB are referred to by the determination model creator 121 or the determination model selector 122, and the determiner 131.

As described above, the facility diagnosis device 51 reflects the information fed back from the inside of the facility diagnosis device 51 to the information acquired from the outside of the facility diagnosis device 51, such as the analysis/diagnosis system 41, the maintenance management system 61, and so on, in order to create the determination model, to select the determination model, and to automatically correct the determination.

The each function of the production state collector 101, the production state storer 102, the production state DB (Database) 103, the virtual facility data converter 111, the facility data collector 112, the facility data storer 113, the facility data DB 114, the data retriever 115, the determination model creator 121, the determination model selector 122, the determiner 131, the result outputter 132, the determination result history DB 133, the association inputter 134, the maintenance data collector 141, the maintenance data storer 142, and the maintenance data DB 143 included in the facility diagnosis device 51 is realized by software, but the one or more functions included in the facility diagnosis device 51 may be realized by hardware. Further, the each function included in the facility diagnosis device 51 may be implemented by dividing one function into a plurality of functions. Furthermore, the each function included in the facility diagnosis device 51 may be implemented by integrating two or more functions into one function.

This concludes the description of the configuration of the facility diagnosis device 51 with reference to FIG. 2.

Figure 3:
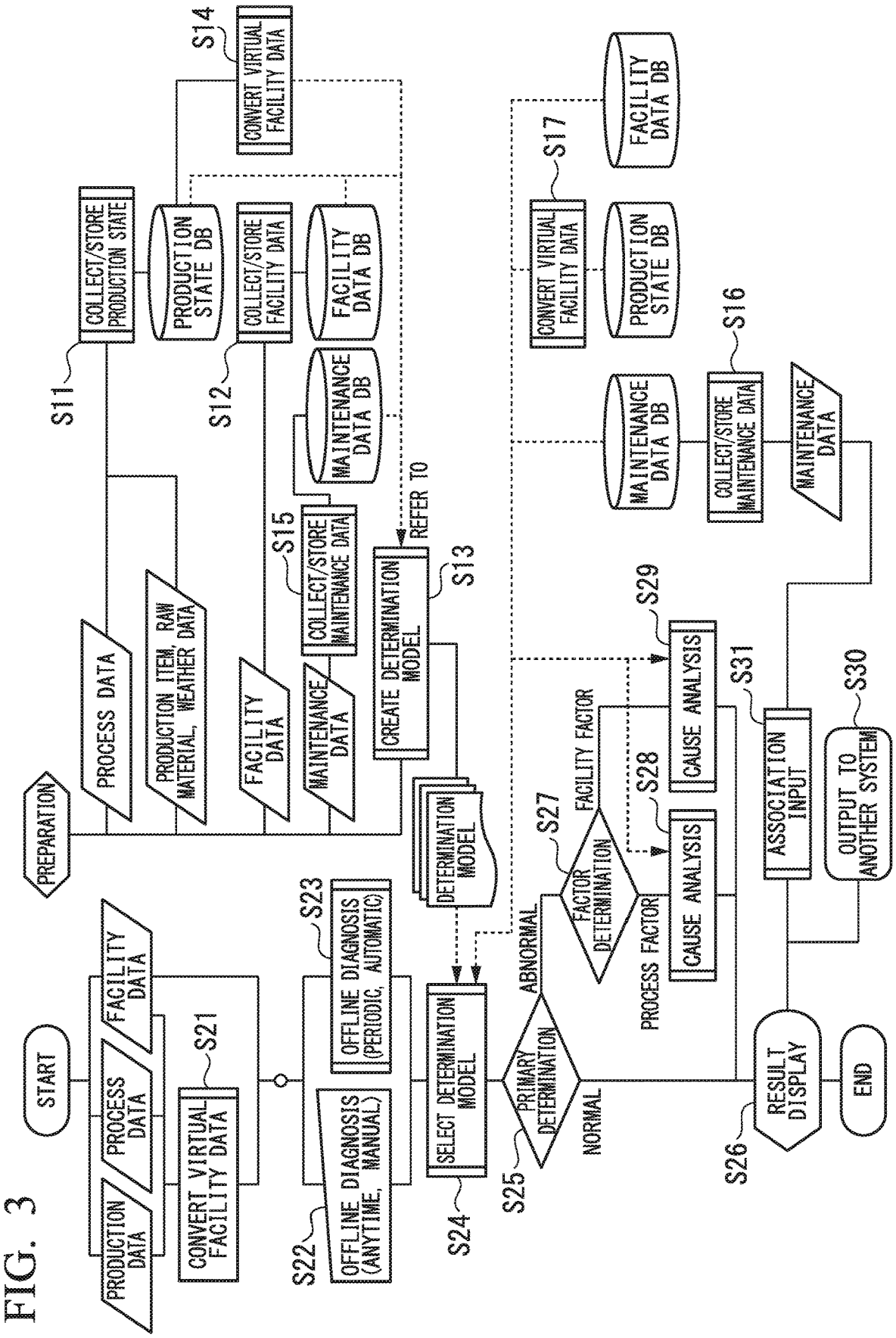
FIG. 3 is a flowchart showing an example of operation of the facility diagnosis device according to one or more embodiments.

Next, operation of the facility diagnosis device 51 will be described with reference to FIG. 3. FIG. 3 is a flowchart showing an example of operation of the facility diagnosis device according to one or more embodiments.

In FIG. 3, the processes from step S11 to step S15 show a preparation process up to creation of a determination model executed by the facility diagnosis device 51. The process of step S16 shows a maintenance data update process for updating the maintenance data as a preparation process of a determination model selection process. The process of step S17 shows a virtual facility data conversion process for generating the virtual facility data as a preparation process of the determination model selection process. The processes from steps S21 to S31 show a facility diagnosis process executed by the facility diagnosis device 51. In the description of FIG. 3, each function of the facility diagnosis device 51 described in FIG. 2 will be referred to.

[Preparation Process]

In the preparation process, first, the facility diagnosis device 51 acquires the process data from the process control device 13, and acquires the production data from the ERP 11 or the MES 12 (step S11). The facility diagnosis device 51 stores, into the production state DB 103, the process data and the production data which have been acquired. The process data and the production data can be acquired online. However, the process data and the production data may be acquired offline. Further, a worker may read the process data and the production data from a paper or the like, and may manually input the process data and the production data. Furthermore, the process data and the production data may be acquired in real time, or may be acquired in batch.

Next, the facility diagnosis device 51 acquires the facility sensor data measured by the facility sensor from the analysis/diagnosis system 41 or the handy terminal 42, and stores it in the facility data DB (step S12). The facility sensor data can be acquired online. However, the facility sensor data may be acquired offline. Further, a worker may read the facility sensor data from a paper or the like, and may manually input the facility sensor data. Furthermore, the facility sensor data may be acquired in real time, or may be acquired in batch.

Next, the facility diagnosis device 51 generates the virtual facility data on the basis of at least one of the production data and the process data stored in the production state DB 103 (step S14). The facility diagnosis device 51 may generate the virtual facility data further on the basis of the facility sensor data in addition to at least one of the production data and the process data.

Next, the facility diagnosis device 51 acquires the maintenance data from the maintenance management system 61, acquires the facility information from the facility ledger 62, further acquires the maintenance data from the association inputter 134, and stores these acquired information in the maintenance DB 143 (step S15). The facility diagnosis device 51 may acquire the facility sensor data from the analysis/diagnosis system 41 or the like, and may store the facility sensor data in association with the maintenance data of the facility.

Next, the facility diagnosis device 51 creates the determination model on the basis of the stored process data, the stored production data, the stored facility sensor data, the converted virtual facility data, the stored maintenance data, and so on (step S13). The facility diagnosis device 51 analyzes and extracts a population to be used for calculating parameters and threshold values of the determination model from the production state DB, the facility data DB, the maintenance data DB, or the virtual facility data, and selects data belonging to the same population, in order to create the determination model. For example, the facility diagnosis device 51 creates the determination model by making a population including data having similar production data. If a plurality of populations are created and analyzed, the facility diagnosis device 51 creates a plurality of determination models corresponding to the number of the analyzed population. For example, when three populations are classified and created on the basis of the production data, three determination models are created.

[Maintenance Data Update Process]

In the maintenance data update process, the facility diagnosis device 51 collects the maintenance data output in the association input process of step S31, and stores the maintenance data in the maintenance data DB (step S16). The maintenance data output in the association input process is input by the worker in association with the determination result. Alternatively, the determination result may be acquired from an external system. The maintenance data stored in the maintenance data DB is referred to in the determination model selection process of step S24 which will be described later.

[Virtual Facility Data Conversion Process]

In the virtual facility data conversion process, similarly to step S14, the facility diagnosis device 51 generates virtual facility data on the basis of at least one of the production data and the process data stored in the production state DB 103 (step S17). The facility diagnosis device 51 may generate the virtual facility data further on the basis of the facility sensor data in addition to at least one of the production data and the process data. Although the virtual facility data conversion process in step S14 and the virtual facility data conversion process in step S17 have been described as the same process, the two process may be different from each other. That is, the virtual facility data used when creating the determination model and the virtual facility data used when selecting the determination model may be different from each other.

[Facility Diagnosis Process]

In the facility diagnosis process, the facility diagnosis device 51 converts the process data acquired from the process control device 13 into the virtual facility data to generate the virtual facility data (step S21). The conversion to the virtual facility data is executed when the process data is acquired.

Next, the facility diagnosis device 51 executes an offline diagnosis on the basis of the generated virtual facility data and the facility sensor data (step S22). The offline diagnosis may be executed to either one of the virtual facility data or the facility sensor data. The offline diagnosis is executed by a manual input operation by a worker. Therefore, execution of the offline diagnosis is arbitrary.

Next, the facility diagnosis device 51 executes an online diagnosis on the basis of the generated virtual facility data and the facility sensor data (step S23). The online diagnosis may be executed to either one of the virtual facility data or the facility sensor data. The online diagnosis is automatically executed at a predetermined cycle (constant cycle).

After executing the process of step S22 or step S23, the facility diagnosis device 51 selects the determination model on the basis of any one or more data of the production data, the virtual facility data, the facility sensor data, and the maintenance data (step S24). The determination model is selected on the basis of a production state of the plant based on the production data, a process state based on the virtual facility data, a facility state based on the facility sensor data, a maintenance state based on the maintenance data, and so on. The determination model selected in the process of step S24 is used in the following determination process.

Next, the facility diagnosis device 51 executes a primary determination on the basis of the selected determination model (step S25). In the primary determination, it is determined whether the facility is normal or abnormal on the basis of one or more data of the virtual facility data and the facility sensor data with reference to threshold and algorithm of the determination model. If it is determined that the facility is normal in the primary determination (step S25: normal), the facility diagnosis device 51 displays the determination result that the facility is normal on the display device (step S26). For example, the display device is a lamp, a display, or the like installed in a control panel of the plant. Further, the facility diagnosis device 51 outputs, to the other system, the determination result representing that the facility is normal (step S30). For example, the other system is the ERP 11, the MES 12, the process control device 13, or the like.

On the other hand, if it is determined that the facility is abnormal in the primary determination (step S25: abnormal), the facility diagnosis device 51 determines whether the factor of the abnormality is a process factor or a facility factor (step S27). The facility diagnosis device 51 determines the factor on the basis of a production state of the plant based on the production data, a process state based on the process data, a facility state based on the facility sensor data, and so on. The facility diagnosis device 51 refers to the threshold value and the algorithm of the determination model selected in the process of step S24 to determine the factor on the basis of one or more data of the virtual facility data and the facility sensor data.

In step S27, if it is determined that the abnormality is a process factor (step S27: process factor), the facility diagnosis device 51 executes more detailed cause analysis on the basis of the process data and so on (step S28). The facility diagnosis device 51 displays the result of the cause analysis executed in the process of step S28 on the display device (step S26). Further, the facility diagnosis device 51 outputs, to the other system, the result of the cause analysis executed in the process of step S28 (step S30).

On the other hand, if it is determined that the abnormality is a facility factor (step S27: facility factor), the facility diagnosis device 51 executes more detailed cause analysis on the basis of the facility sensor data and so on (step S29). The facility diagnosis device 51 displays the result of the cause analysis executed in the process of step S29 on the display device (step S26). Further, the facility diagnosis device 51 outputs, to the other system, the result of the cause analysis executed in the process of step S29 (step S30).

After executing the process of step S26, the facility diagnosis device 51 executes the association input process on the basis of the determination result representing that the facility is normal, the result of the cause analysis executed in the process of step S28, or the result of the cause analysis executed in the process of step S29 (step S31). The association input process in step S31 enables to input the maintenance data of the facility corresponding to the determination result representing that the facility is normal, the result of the cause analysis executed in the process of step S28, or the result of the cause analysis executed in the process of step S29. That is, the worker can record own know-how not only in a case where the facility is abnormal, but in a case where the determination result is normal, and in a case where the abnormality is a process factor.

This concludes the description of the operation of the facility diagnosis device 51 with reference to FIG. 3.

Figure 4:
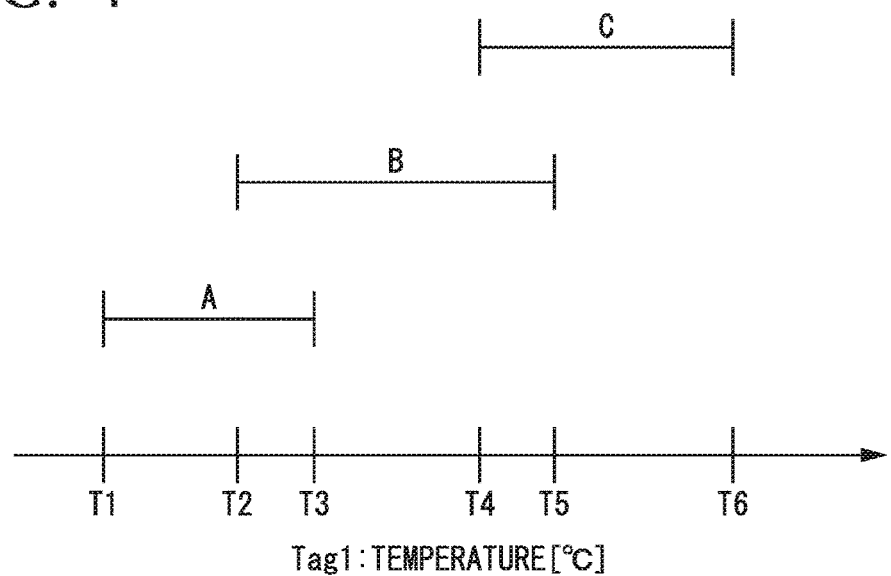
FIG. 4 is a drawing showing a selection example of the first determination model of the facility diagnosis device according to one or more embodiments.

Next, a selection example of a first determination model of the facility diagnosis device 51 will be described with reference to FIG. 4. FIG. 4 is a drawing showing a selection example of the first determination model of the facility diagnosis device according to one or more embodiments.

The parameter of the determination model shown in FIG. 4 is one-dimension indicated by "Tag 1: temperature". The parameter of the determination model is temperature data acquired as the facility sensor data. The determination model A is a determination model in a case where the temperature range is from T1 to T3. The determination model B is a determination model in a case where the temperature range is from T2 to T5. The determination model C is a determination model in a case where the temperature range is from T4 to T6.

The determination model selector 122 selects the determination model A when the production load based on the production data is "low load", selects the determination model B when the production load based on the production data is "medium load", and selects the determination model C when the production load based on the production data is "high load".

When the determination model A is selected, the determiner 131 determines that the facility 31 is normal if the facility sensor data is within the range from T1 to T3, and the determiner 131 determines that the facility 31 is abnormal if the facility sensor data is outside the range from T1 to T3.

When the determination model B is selected, the determiner 131 determines that the facility 31 is normal if the facility sensor data is within the range from T2 to T5, and the determiner 131 determines that the facility 31 is abnormal if the facility sensor data is outside the range from T2 to T5.

When the determination model C is selected, the determiner 131 determines that the facility 31 is normal if the facility sensor data is within the range from T4 to T6, and the determiner 131 determines that the facility 31 is abnormal if the facility sensor data is outside the range from T4 to T6.

This concludes the description of the selection example of the first determination model of the facility diagnosis device 51 with reference to FIG. 4.

Figure 5:
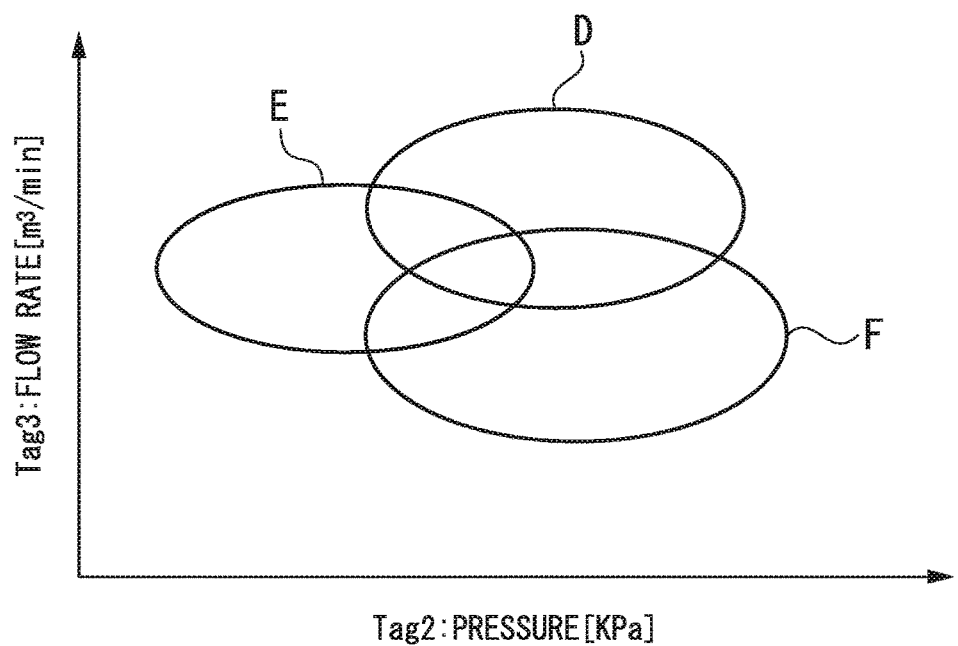
FIG. 5 is a drawing showing a selection example of the second determination model of the facility diagnosis device according to one or more embodiments.

Next, a selection example of a second determination model of the facility diagnosis device 51 will be described with reference to FIG. 5. FIG. 5 is a drawing showing a selection example of the second determination model of the facility diagnosis device according to one or more embodiments.

The parameters of the determination model exemplified in FIG. 5 are two-dimension shown by "Tag 2: pressure" and "Tag 3: flow rate". The parameters of the determination model are pressure data and flow rate data acquired as the process data. The determination model D, the determination model E, and the determination model F are determination models of range of the pressure and the flow rate shown in the drawing.

The determination model selector 122 selects the determination model on the basis of process data exemplified as feed flow rate in the process and production data exemplified as elapsed days after maintenance.

For example, the determination model selector 122 selects the determination model D, E, or F if the feed flow rate and the elapsed days after maintenance match the following conditions.

First, the determination model selector 122 selects the determination model D if the feed flow rate is more than or equal to 50 m$^3$ and the elapsed days after maintenance is less than 90 days.

The determination model selector 122 selects the determination model E if the feed flow rate is more than or equal to 100 m$^3$ and the elapsed days after maintenance is more than or equal to 365 days.

Further, the determination model selector 122 selects the determination model F if the feed flow rate and the elapsed days after maintenance do not match the above-described conditions.

The determiner 131 determines that the facility 31 is normal if the pressure data and the flow rate data are within the elliptical range shown in FIG. 5 selected as the determination model, and the determiner 131 determines that the facility 31 is abnormal if the pressure data and the flow rate data are outside the elliptical range shown in the drawing selected as the determination model.

This concludes the description of the selection example of the second determination model of the facility diagnosis device 51 with reference to FIG. 5.

Further, various processes of one or more embodiments described above may be performed by recording a program for realizing the functions of the device described in one or more embodiments in a computer-readable recording medium, loading the program recorded on the recording medium to a computer system, and executing the program. Note that the "computer system" referred to herein may include an OS or hardware such as a peripheral device. Further, the "computer system" also includes a homepage providing environment (or a display environment) when a WWW system is used. Further, the "computer-readable recording medium" refers to a flexible disk, a magneto-optical disc, a ROM, or a writable nonvolatile memory such as a flash memory, a portable medium such as a CD-ROM, or a storage device such as a hard disk built into the computer system.

Further, the "computer-readable recording medium" also includes a recording medium that holds a program for a certain time, such as a volatile memory (dynamic random access memory (DRAM)) inside a computer system including a server and a client when a program is transmitted via a network such as the Internet or a communication line such as a telephone line. Further, the above program may be transferred from a computer system in which the program is stored in a storage device or the like to other computer systems via a transmission medium or by transmission waves in the transmission medium. Here, the "transmission medium" for transmitting the program refers to a medium having a function of transferring information, such as a network (communication network) such as the Internet or a communication line such as a telephone line. Further, the above program may be a program for realizing some of the above-described functions. Further, the program may be a program capable of realizing the above-described functions in combination with a program previously stored in a computer system, that is, a differential file (a differential program).

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

INDUSTRIAL APPLICABILITY

Embodiments of the present invention are widely applicable to a facility diagnosis device, a facility diagnosis method, and a facility diagnosis program, and makes it possible to accurately diagnose a state of a facility.

REFERENCE SIGNS LIST

1 Facility diagnosis system
11 ERP
12 MES
13 Process control device
14 Facility control device
21 Process device
31 Facility
32 Facility sensor
41 Analysis/diagnosis system
42 Handy Terminal
51 Facility diagnosis device
101 Production state collector
102 Production state storer
103 Production state DB
111 Virtual facility data converter
112 Facility data collector
113 Facility data storer
114 Facility data DB
115 Data retriever
121 Determination model creator
122 Determination model selector
131 Determiner
1311 Primary determiner
1312 Factor determiner
1313 Cause analyzer
132 Result outputter
133 Determination result history DB

The invention claimed is:

1. A facility diagnosis device comprising:
a process data acquirer that acquires process data indicating a state of a process executed in a plant;
a production data acquirer that acquires production data indicating a production state in the plant;
a state information generator that generates state information for estimating an operation state of a facility operating in the process based on at least one of the acquired process data and the acquired production data;
a determination model creator that creates a plurality of populations based on the acquired production data and a plurality of determination models based on the acquired process data, wherein the number of the plurality of determination models corresponds to the number of the plurality of populations, and the plurality of determination models have different threshold values or different algorithms;
a determination model selector that selects a determination model from among the plurality of determination models based on the generated state information;
a determiner that determines the operation state of the facility based on the acquired process data or the generated state information and the acquired production data, wherein the determiner further determines the operation state of the facility using the selected determination model;

a result outputter that outputs, to a display device, a result of the determined operation state of the facility; and an association inputter that receives an input maintenance data in which the result of the operation state output by the result outputter and an operation state of the facility checked by a worker are associated with one another.

2. The facility diagnosis device according to claim 1, further comprising a facility data collector that collects facility data measured by a sensor attached to the facility.

3. The facility diagnosis device according to claim 2, wherein the determination model creator creates the plurality of determination models further based on collected facility data.

4. The facility diagnosis device according to claim 2, wherein the determination model selector selects the determination model from among the plurality of determination models based on the generated state information or the collected facility data.

5. The facility diagnosis device according to claim 1, further comprising a maintenance data storer that collects and stores maintenance data of the facility corresponding to the determined operation state of the facility, wherein the determination model creator creates the plurality of determination models further based on the stored maintenance data.

6. The facility diagnosis device according to claim 5, wherein the maintenance data storer collects and stores the maintenance data comprising at least one of the maintenance data of the facility and failure data of the facility.

7. A facility diagnosis method comprising:

acquiring process data indicating a state of a process executed in a plant;

acquiring production data indicating a production state in the plant;

generating state information for estimating an operation state of a facility operating in the process based on at least one of the acquired process data and the acquired production data;

creating a plurality of populations based on the acquired production data and a plurality of determination models based on the acquired process data, wherein the number of the plurality of determination models correspond to the number of the plurality of populations, and the plurality of determination models have different threshold values or different algorithms;

selecting a determination model from among the plurality of determination models based on the generated state information;

determining the operation state of the facility based on the acquired process data or the generated state information and the acquired production data and determining the operation state of the facility using the selected determination model;

outputting, to a display device, a result of the determined operation state of the facility; and receiving an input maintenance data in which the result of the operation state and an operation state of the facility checked by a worker are associated with one another.

8. The facility diagnosis method according to claim 7, further comprising collecting facility data measured by a sensor attached to the facility.

9. The facility diagnosis method according to claim 8, wherein the creating of the plurality of determination models comprises creating the determination model further based on the collected facility data.

10. The facility diagnosis method according to claim 8, wherein the selecting of the created determination model comprises selecting the determination model from among the plurality of determination models based on the generated state information or the collected facility data.

11. The facility diagnosis method according to claim 7, further comprising collecting and storing maintenance data of the facility corresponding to the determined operation state of the facility, wherein the creating of the plurality of determination models comprises creating the plurality of determination models further based on the stored maintenance data.

12. The facility diagnosis method according to claim 11, wherein the maintenance data comprises at least one of the maintenance data of the facility and failure data of the facility.

13. A non-transitory computer readable storage medium storing facility diagnosis program for making a computer execute:

acquiring process data indicating a state of a process executed in a plant;

acquiring production data indicating a production state in the plant;

generating state information for estimating an operation state of a facility operating in the process based on at least one of the acquired data and the acquired production data;

creating a plurality of populations based on the acquired production data and a plurality of determination models based on the acquired process data, wherein the number of the plurality of determination models correspond to the number of the plurality of populations, and the plurality of determination models have different threshold values or different algorithms;

selecting a determination model from among the plurality of determination models based on the generated state information;

determining the operation state of the facility based on the acquired process data or the generated state information and the acquired production data and determining the operation state of the facility using the selected determination model;

outputting, to a display device, a result of the determined operation state of the facility; and receiving an input maintenance data in which the result of the operation state and an operation state of the facility checked by a worker are associated with one another.

\* \* \* \* \*